US012621024B2

(12) United States Patent
Lee et al.

(10) Patent No.: US 12,621,024 B2
(45) Date of Patent: May 5, 2026

(54) METHOD AND APPARATUS FOR SIDELINK TRANSMISSION IN WIRELESS COMMUNICATION SYSTEM

(71) Applicant: SAMSUNG ELECTRONICS CO., LTD., Suwon-si (KR)

(72) Inventors: Byongok Lee, Suwon-si (KR); Joohyun Do, Suwon-si (KR); Hyunseok Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 353 days.

(21) Appl. No.: 18/227,143

(22) Filed: Jul. 27, 2023

(65) Prior Publication Data

US 2024/0154843 A1 May 9, 2024

(30) Foreign Application Priority Data

Nov. 7, 2022 (KR) ........................ 10-2022-0147378

(51) Int. Cl.
*H04B 7/0456* (2017.01)
*H04L 5/14* (2006.01)
(Continued)

(52) U.S. Cl.
CPC ......... *H04B 7/0486* (2013.01); *H04B 7/0456* (2013.01); *H04L 5/1469* (2013.01);
(Continued)

(58) Field of Classification Search
CPC .............. H04L 25/0214; H04L 25/0248; H04L 25/0242; H04B 7/0456; H04B 7/0482;
(Continued)

(56) References Cited

U.S. PATENT DOCUMENTS 10,805,934 B2    10/2020  Kim et al.
10,998,954 B2 *   5/2021  Huang ................. H04B 7/0626
(Continued)

FOREIGN PATENT DOCUMENTS

KR          10-2166380 B1    10/2020
KR      10-2021-0011880 A     2/2021
(Continued)

OTHER PUBLICATIONS

Communication dated Apr. 17, 2024, issued by the European Patent Office in European Application No. 23207697.6.
(Continued)

*Primary Examiner* — Redentor Pasia
(74) *Attorney, Agent, or Firm* — Sughrue Mion, PLLC

(57)    ABSTRACT

An operating method of a first device which communicates with a second device based on time division duplex (TDD), includes: receiving a first signal from the second device; estimating a channel between the first device and the second device based on the first signal; generating, by applying singular value decomposition (SVD) to the estimated channel, a first orthogonal matrix including one or more left singular vectors, a diagonal matrix including one or more singular values, and a second orthogonal matrix including one or more right singular vectors; selecting at least one right singular vector from the second orthogonal matrix in descending order according to the one or more singular values, a number of the selected at least one right singular vector corresponding to a number of ranks of the channel; and transmitting, to the second device, a precoded physical sidelink shared channel (PSSCH) precoded based on a precoding matrix including the selected at least one right singular vector.

20 Claims, 11 Drawing Sheets

(51) Int. Cl.
  *H04L 25/02* (2006.01)
  *H04W 92/18* (2009.01)
(52) U.S. Cl.
  CPC ...... *H04L 25/0214* (2013.01); *H04L 25/0242* (2013.01); *H04W 92/18* (2013.01)
(58) Field of Classification Search
  CPC .. H04B 7/0486; H04B 7/0413; H04B 7/0632; H04B 7/0639; H04W 72/1263; H04W 92/18
  See application file for complete search history.

(56) References Cited

U.S. PATENT DOCUMENTS

| | | | | |
|---|---|---|---|---|
| 2004/0087324 | A1* | 5/2004 | Ketchum | H04B 7/0669 455/67.11 |
| 2019/0174530 | A1 | 6/2019 | Kim et al. | |
| 2020/0252255 | A1* | 8/2020 | Sorrentino | H04B 7/0456 |
| 2020/0389215 | A1* | 12/2020 | Yuan | H04B 7/0634 |
| 2021/0067277 | A1 | 3/2021 | Wu et al. | |
| 2021/0144570 | A1* | 5/2021 | Chae | H04W 72/02 |
| 2021/0152313 | A1 | 5/2021 | El Assaad et al. | |
| 2021/0298039 | A1 | 9/2021 | Yuan | |
| 2021/0314933 | A1 | 10/2021 | Zhang et al. | |
| 2021/0345364 | A1 | 11/2021 | Zhang et al. | |
| 2022/0007388 | A1 | 1/2022 | Lee et al. | |
| 2022/0104220 | A1 | 3/2022 | Huang et al. | |
| 2022/0109475 | A1* | 4/2022 | Soriaga | H04B 7/0486 |
| 2022/0110129 | A1 | 4/2022 | Huang et al. | |
| 2022/0210779 | A1 | 6/2022 | Shin et al. | |
| 2022/0271892 | A1* | 8/2022 | Peng | H04L 5/0094 |
| 2022/0312252 | A1* | 9/2022 | Peng | H04B 17/327 |
| 2022/0393735 | A1* | 12/2022 | Xue | H04B 7/0626 |
| 2025/0081021 | A1* | 3/2025 | Bi | H04B 17/318 |
| 2025/0274167 | A1* | 8/2025 | Shi | H04B 7/0413 |

FOREIGN PATENT DOCUMENTS

| | | |
|---|---|---|
| KR | 10-2021-0107879 A | 9/2021 |
| KR | 10-2022-0092187 A | 7/2022 |
| WO | 2022/169513 A1 | 8/2022 |

OTHER PUBLICATIONS

Peng et al., "Performance of Dual-Polarized MIMO for TD-HSPA Evolution Systems", IEEE Systems Journal, IEEE, Sep. 3, 2011, vol. 5, No. 3, pp. 406-416 (11 pages total).

* cited by examiner

FIG. 5

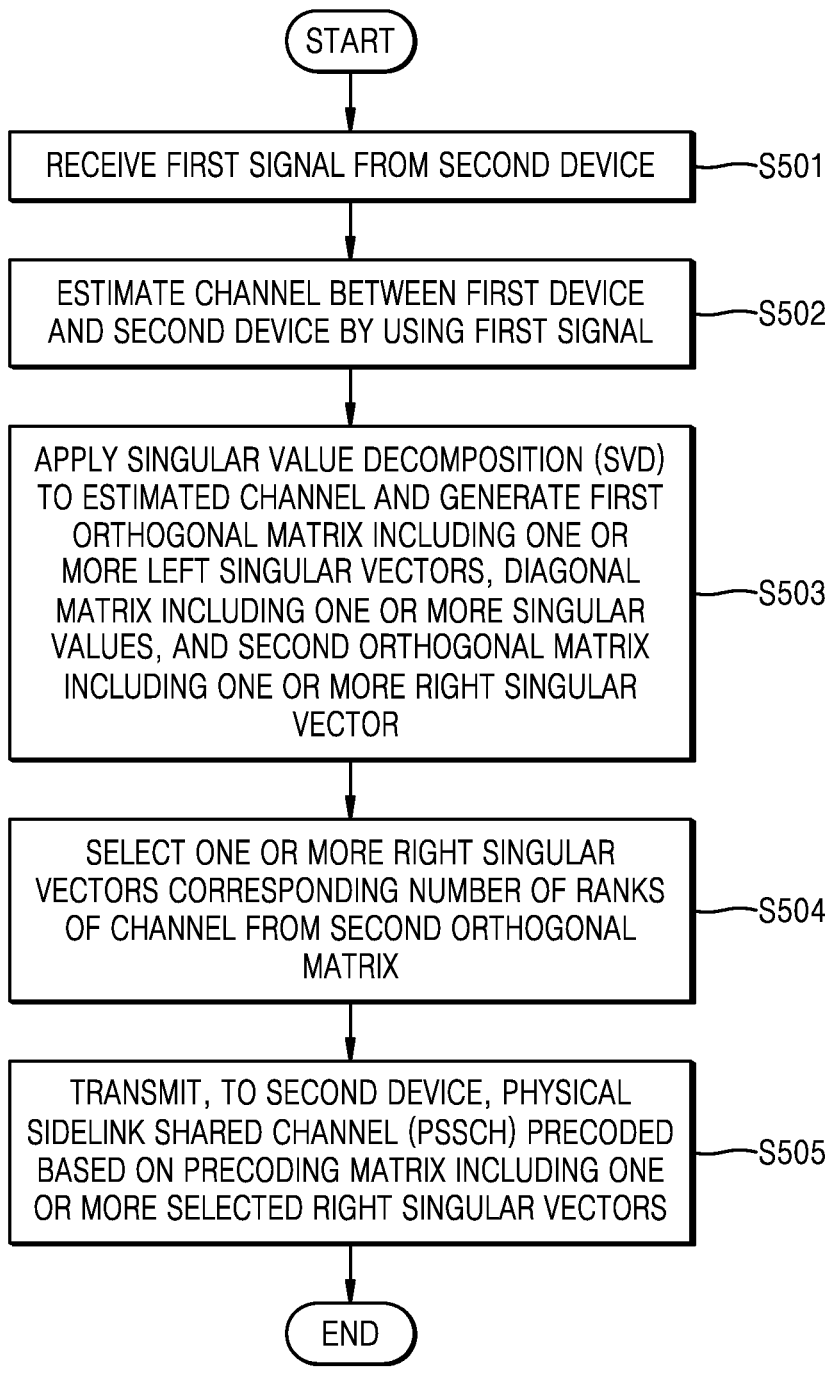

START

RECEIVE FIRST SIGNAL FROM SECOND DEVICE ——S501

ESTIMATE CHANNEL BETWEEN FIRST DEVICE AND SECOND DEVICE BY USING FIRST SIGNAL ——S502

APPLY SINGULAR VALUE DECOMPOSITION (SVD) TO ESTIMATED CHANNEL AND GENERATE FIRST ORTHOGONAL MATRIX INCLUDING ONE OR MORE LEFT SINGULAR VECTORS, DIAGONAL MATRIX INCLUDING ONE OR MORE SINGULAR VALUES, AND SECOND ORTHOGONAL MATRIX INCLUDING ONE OR MORE RIGHT SINGULAR VECTOR ——S503

SELECT ONE OR MORE RIGHT SINGULAR VECTORS CORRESPONDING NUMBER OF RANKS OF CHANNEL FROM SECOND ORTHOGONAL MATRIX ——S504

TRANSMIT, TO SECOND DEVICE, PHYSICAL SIDELINK SHARED CHANNEL (PSSCH) PRECODED BASED ON PRECODING MATRIX INCLUDING ONE OR MORE SELECTED RIGHT SINGULAR VECTORS ——S505

END

Rank1 PSSCH transmission

METHOD AND APPARATUS FOR SIDELINK TRANSMISSION IN WIRELESS COMMUNICATION SYSTEM

CROSS-REFERENCE TO RELATED APPLICATION

This application claims benefit of priority under 35 U.S.C. § 119 to Korean Patent Application No. 10-2022-0147378, filed on Nov. 7, 2022, in the Korean Intellectual Property Office, the disclosure of which is incorporated by reference herein in its entirety.

BACKGROUND

The present disclosure relates to a method and apparatus for sidelink transmission in a wireless communication system, and more particularly, to a method and apparatus for sidelink transmission using multiple antennas.

To meet the increase in demand with respect to wireless data traffic after the commercialization of $4^{th}$ generation (4G) communication systems, considerable efforts have been made to develop pre-$5^{th}$ generation (5G) communication systems or 5G communication systems. For this reason, the 5G or pre-5G communication system may also be referred to as a beyond 4G network communication system and/or a post long term evolution (LTE) system.

In order to attempt to achieve a high data rate, related 5G communication systems may be implemented using a super-high frequency band such as, but not limited to, a millimeter wave band (mmWave) (e.g., a band of about 60 GHz). To potentially reduce propagation loss of radio waves and/or potentially increase a transmission range of radio waves in the ultra-high frequency bands, features such as, but not limited to, beamforming, massive multiple-input multiple-output (MIMO), full dimensional MIMO (FD-MIMO), array antennas, analog beamforming, and large-scale antenna techniques may be under discussion.

Alternatively or additionally, the Internet may be evolving from a human-oriented connectivity network, where humans generate and/or consume information, to an Internet of Things (IoT) network, where distributed entities (e.g., things) send, receive, and/or process information without human intervention. Consequently, an Internet of Everything (IoE) technology in which big data processing technology via a connection with a cloud server or the like may be combined with the IoT technology may be emerging. To implement IoT, various technological elements, such as, but not limited to, sensing technology, wired/wireless communication and network infrastructures, service interface technology, and security technology, may be required, such that technologies related to sensor networks for connecting objects, machine-to-machine (M2M) communication, and machine-type communication (MTC) may have been studied.

In an IoT environment, intelligent Internet (or information) technology (IT) services may be provided to collect and/or analyze data obtained from objects connected to each other to create new value in human life. For example, IoT may be applied to fields, such as, but not limited to, smart homes, smart buildings, smart cities, smart cars or connected cars, smart grids, health care, smart home appliances, and/or advanced medical services, through convergence and integration of existing IT and various industries.

In this regard, various attempts to apply the 5G communication system to the IoT network may have being made. For example, 5G communication, such as sensor networks, M2M communication, MTC, and the like, may have been attempted by using techniques such as, but not limited to, beamforming, MIMO, array antennas, and the like.

Sidelink may refer to a direct communication scheme between two devices without participation of a base station when transmitting and/or receiving data traffic. Direct communication between terminals using sidelink communication may be applied to, for example, vehicle-to-everything (V2X) and public safety networks to provide various services to users, among other fields. Thus, there may be an increased demand for data transmissions using sidelink communications.

SUMMARY

Example embodiments of the present disclosure provide methods and devices for performing sidelink transmission using multiple antennas.

According to an aspect of an example embodiment, an operating method of a first device which communicates with a second device based on time division duplex (TDD), includes: receiving a first signal from the second device; estimating a channel between the first device and the second device based on the first signal; generating, by applying singular value decomposition (SVD) to the estimated channel, a first orthogonal matrix including one or more left singular vectors, a diagonal matrix including one or more singular values, and a second orthogonal matrix including one or more right singular vectors; selecting at least one right singular vector from the second orthogonal matrix in descending order according to the one or more singular values, a number of the selected at least one right singular vector corresponding to a number of ranks of the channel; and transmitting, to the second device, a precoded physical sidelink shared channel (PSSCH) precoded based on a precoding matrix including the selected at least one right singular vector.

According to an aspect of an example embodiment, an operating method of a first device which communicates with a second device based on time division duplex (TDD), includes: receiving, from the second device, a first signal which is based on a single port or two ports; estimating a channel matrix between the first device and the second device based on the first signal; determining a precoding matrix based on the channel matrix; and transmitting, to the second device, a precoded physical sidelink shared channel (PSSCH) precoded based on the precoding matrix to the second device, wherein the first signal based on the single port includes at least one of a single port-PSSCH, a physical sidelink feedback channel (PSFCH), a sidelink primary synchronization signal (P-SSS), a sidelink secondary synchronization signal (S-SSS), or a physical sidelink broadcast channel (PSBCH), and wherein the first signal based on the two ports includes a 2 port-PSSCH.

According to an aspect of an example embodiment, an first device which communicates with a second device based on time division duplex (TDD), includes: a transceiver; a memory storing instructions; and a processor communicatively coupled to the transceiver and the memory, and configured to execute the instructions to: receive a first signal from the second device through the transceiver; estimate a channel between the first device and the second device based on the first signal; generate, by applying singular value decomposition (SVD) to the estimated channel, a first orthogonal matrix including one or more left singular vectors, a diagonal matrix including one or more singular values, and a second orthogonal matrix including one or more right singular vectors; select at least one right singular vector from the second orthogonal matrix in descending order according to the one or more singular values, a number of the selected at least one right singular vector corresponding to a number of ranks of the channel; and transmit, to the second device through the transceiver, a precoded physical sidelink shared channel (PSSCH) precoded based on a precoding matrix and including the selected at least one right singular vector.

BRIEF DESCRIPTION OF THE DRAWINGS

The above and other aspects, features, and advantages of certain example embodiments of the present disclosure will be more apparent from the following description taken in conjunction with the accompanying drawings, in which:

FIG. 5 depicts an operating method of a first device, according to an embodiment;

DETAILED DESCRIPTION

Figure 1:
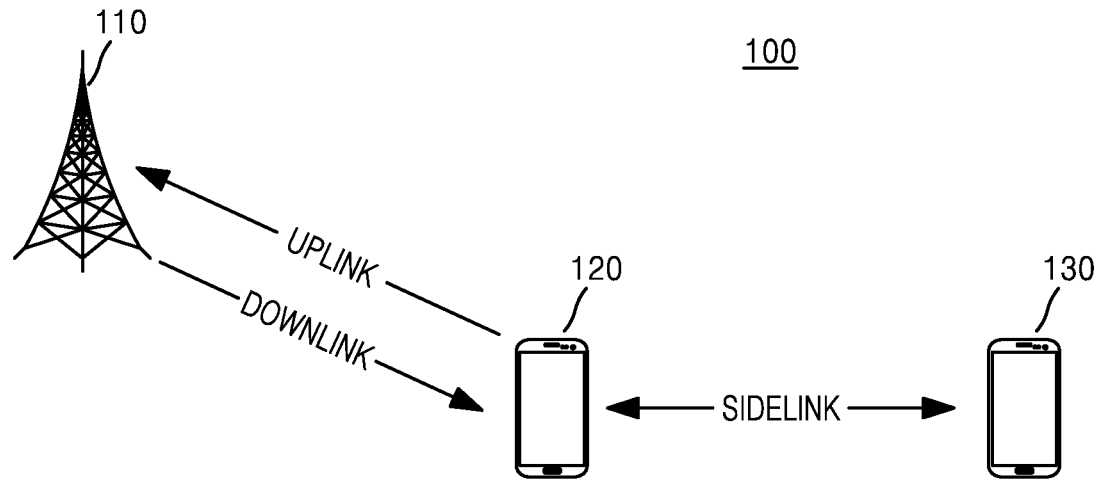
FIG. 1 is a diagram illustrating a wireless communication system, according to an embodiment.

As used herein, a base station may refer to an entity for communicating with a wireless communication device and allocating communication network resources to the wireless communication device. The base station may be and/or may include at least one of a cell, a base station, a NodeB (NB), an eNodeB (eNB), a next generation radio access network (NG RAN), a radio access unit, a base station controller, a node on a network, a gNodeB (gNB), a transmission and reception point (TRP), a remote radio head (RRH), and the like.

A wireless communication device may refer an entity for communicating with a base station and/or another wireless communication device and may be referred to as user equipment (UE), a next generation UE (NG UE), a mobile station (MS), mobile equipment (ME), a device, a terminal, and the like.

Alternatively or additionally, the wireless communication device may be and/or may include at least one of a smartphone, a tablet, a personal computer (PC), a mobile phone, a video phone, an electronic book reader, a desktop PC, a laptop PC, a netbook computer, a personal digital assistant (PDA), a portable multimedia player (PMP), an MPEG-1 Audio Layer 3 (MP3) player, a medical device, a camera, and a wearable device (e.g., a smart watch, a headset, headphones, a haptic glove, glasses, and the like). In an optional or additional embodiment, the wireless communication device may be and/or may include at least one of a television (TV), a digital video disk (DVD), a stereo, a smart device (e.g., a refrigerator, an air conditioner, a vacuum cleaner, an oven, a microwave oven, a washing machine, an air purifier, a set-top box (STB), a home automation control panel, a security control panel, a media box (e.g., Samsung HomeSync™, Apple TV™, Google TV™), a game console (e.g., Xbox™, PlayStation™), an electronic dictionary, electronic keys, a camcorder, and an electronic frames. In another optional or additional embodiment, the wireless communication device may be and/or may include at least one of various medical devices (e.g., various portable medical measuring devices (e.g., glucose meters, heart rate monitors, blood pressure monitors, body temperature monitors, and the like), magnetic resonance angiography (MRA) machines, magnetic resonance imaging (MRI) machines, computed tomography (CT) machines, cameras, and/or ultra-sonicators), navigation devices, satellite navigation systems (e.g., global navigation satellite systems (GNSSs)), event data recorders (EDRs), flight data recorders (FDRs), automotive infotainment devices, marine electronics (e.g., marine navigation systems, gyrocompasses, and the like), avionics, security devices, vehicle head units, industrial and/or home robots, drones, automated teller machines (ATMs), point of sales (POS) devices, and/or Internet of Things (IoT) devices (e.g., light bulbs, various sensors, sprinkler devices, fire alarms, thermostats, street lights, toasters, exercise equipment, hot water tanks, heaters, boilers, and the like). Alternatively or additionally, the wireless communication device may be and/or may include multimedia systems of various types capable of performing communication functions.

Hereinafter, embodiments of the present disclosure are described with reference to the accompanying drawings.

FIG. 1 illustrates a wireless communication system, according to an embodiment.

Referring to FIG. 1, the wireless communication system 100 may include wireless communication devices (e.g., first device 120 and second device 130) and a base station 110. For convenience of description, the wireless communication system 100 is shown as including only one base station 110 and two wireless communication devices 120 and 130. However, this is only an example, and the present disclosure is not limited thereto. That is, the wireless communication system 100 may be implemented to include a variable number of base stations and wireless communication devices.

The base station 110 may be connected to the first device 120 via a wireless channel to provide various communication services. For example, the base station 110 may provide services through a shared channel for all user traffic, and/or may perform scheduling by collecting state information, such as, but not limited to, a buffer state, an available transmission power state, and a channel state of the first device 120. In an embodiment, the wireless communication system 100 may support beam forming technology by using orthogonal frequency division multiplexing (OFDM) as radio access technology. Alternatively or additionally, the wireless communication system 100 may support an adaptive modulation & coding (MAC) scheme for determining a modulation scheme and/or a channel coding rate, according to a channel state of the first device 120.

In an embodiment, the wireless communication system 100 may transmit and/or receive signals by using a wide frequency band such as, but not limited to, a frequency band of 6 GHz or higher. For example, the wireless communication system 100 may increase a data transmission rate by using a millimeter wave band, such as a 28 GHz band and/or a 60 GHz band. However, because the millimeter wave band may have a relatively large signal attenuation per distance, the wireless communication system 100 may support transmission and/or reception based on directional beams generated by using multiple antennas to ensure coverage. For example, the wireless communication system 100 may be and/or may include a system supporting multiple input, multiple output (MIMO). That is, the base station 110 and the wireless communication devices 120 and 130 may support beamforming technology. Beamforming technology may be classified into digital beamforming, analog beamforming, and/or hybrid beamforming. Although the present disclosure is described with a wireless communication system 100 based on an embodiment supporting hybrid beamforming technology, the present disclosure may also be applied to other beamforming technologies without departing from the scope of the claims.

Referring to FIG. 1, a link from the base station 110 to the first device 120 may be referred to as downlink. A link from the first device 120 to the base station 110 may be referred to as uplink. A link between the first device 120 and the second device 130 may be referred to as sidelink.

The first device 120 may receive a signal from the second device 130 over the sidelink. The first device 120 may estimate a channel between the first device 120 and the second device 130 by using the received signal. The first device 120 may determine a precoding matrix by using the estimated channel. The first device 120 may transmit a precoded physical sidelink shared channel (PSSCH) to the second device 130 that may have been precoded by using the precoding matrix. The first device 120 may increase data transmission amount and sidelink coverage by transmitting the precoded PSSCH in sidelink communication.

Figure 2:
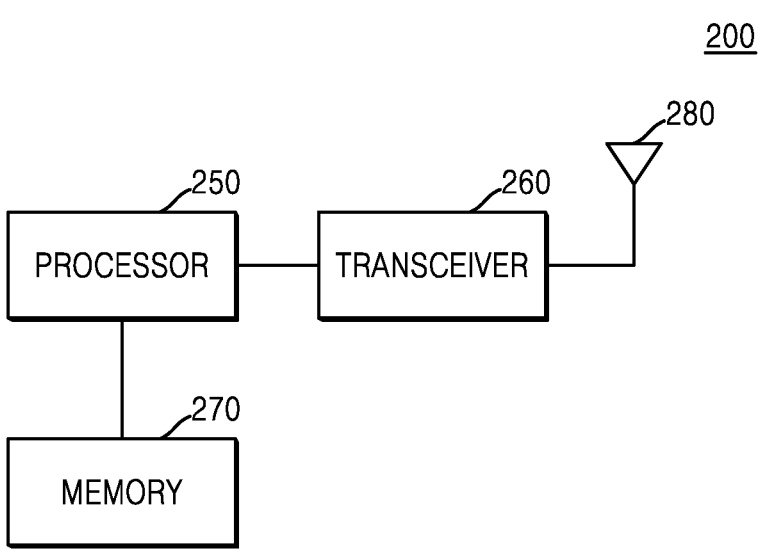
FIG. 2 illustrates a wireless communication device, according to an embodiment.

FIG. 2 illustrates a wireless communication device, according to an embodiment.

A wireless communication device 200 may be applied to a computer, a smartphone, a portable electronic device, a tablet, a wearable device, and a sensor used in IoT, and the like.

Referring to FIG. 2, the wireless communication device 200 of FIG. 2 may include a processor 250, a transceiver 260, a memory 270, and an antenna 280.

The processor 250 may control all operations of the transceiver 260 and/or may write and/or read data in the memory 270. The transceiver 260 may transmit and/or receive wireless signals and/or may be controlled by the processor 250.

In an embodiment, the wireless communication device 200 is included in a transmitting device (e.g., when the wireless communication device 200 performs a transmission function), the transceiver 260 may generate a physical layer convergence protocol (PLCP) protocol data unit (PPDU) including a preamble and a payload, and transmit the generated PPDU to a receiving device.

On the other hand, when the wireless communication device 200 is included in a receiving device (e.g., when the wireless communication device 200 performs a reception function), the transceiver 260 may receive a PPDU including a preamble and a payload from the transmitting device. Alternatively or additionally, the transceiver 260 may decode the payload based on the preamble of the received PPDU. That is, the transceiver 260 may decode the preamble of the PPDU through an inner decoder thereof, and/or decode the payload of the PPDU based on a result of the decoding.

The memory 270 may store data, such as a basic program, an application program, configuration information, for operations of the wireless communication device 200. Accordingly, the memory 270 may store instructions and/or data related to the processor 250 and/or the transceiver 260.

The antenna 280 may be connected (e.g., coupled) to the transceiver 260. For example, the antenna 280 may transmit a signal received from the transceiver 260 to another wireless communication device (e.g., a terminal, a base station). Alternatively or additionally, the antenna 280 may provide a signal received from another wireless communication device to the transceiver 260.

As shown in FIG. 2, the wireless communication device 200 may include the transceiver 260 and the processor 250. The processor 250 may receive a first signal from another wireless communication device through the transceiver 260. The wireless communication device 200 may estimate a channel between the wireless communication device 200 and the other wireless communication device by using the first signal. The processor 250 may be configured to generate a first orthogonal matrix including one or more left singular vectors by applying singular value decomposition (SVD) to the estimated channel. The processor 250 may be further configured to generate a diagonal matrix including one or more singular values, and/or a second orthogonal matrix including one or more right singular vectors. The processor 250 may be configured to select the one or more right singular vectors corresponding to the number of ranks of the channel in the second orthogonal matrix in descending order according to singular values. The processor 250 may be configured to transmit, to another wireless communication device through the transceiver 260, a precoded PSSCH that may have been precoded based on a precoding matrix including the one or more selected right singular vectors.

Figure 3A:
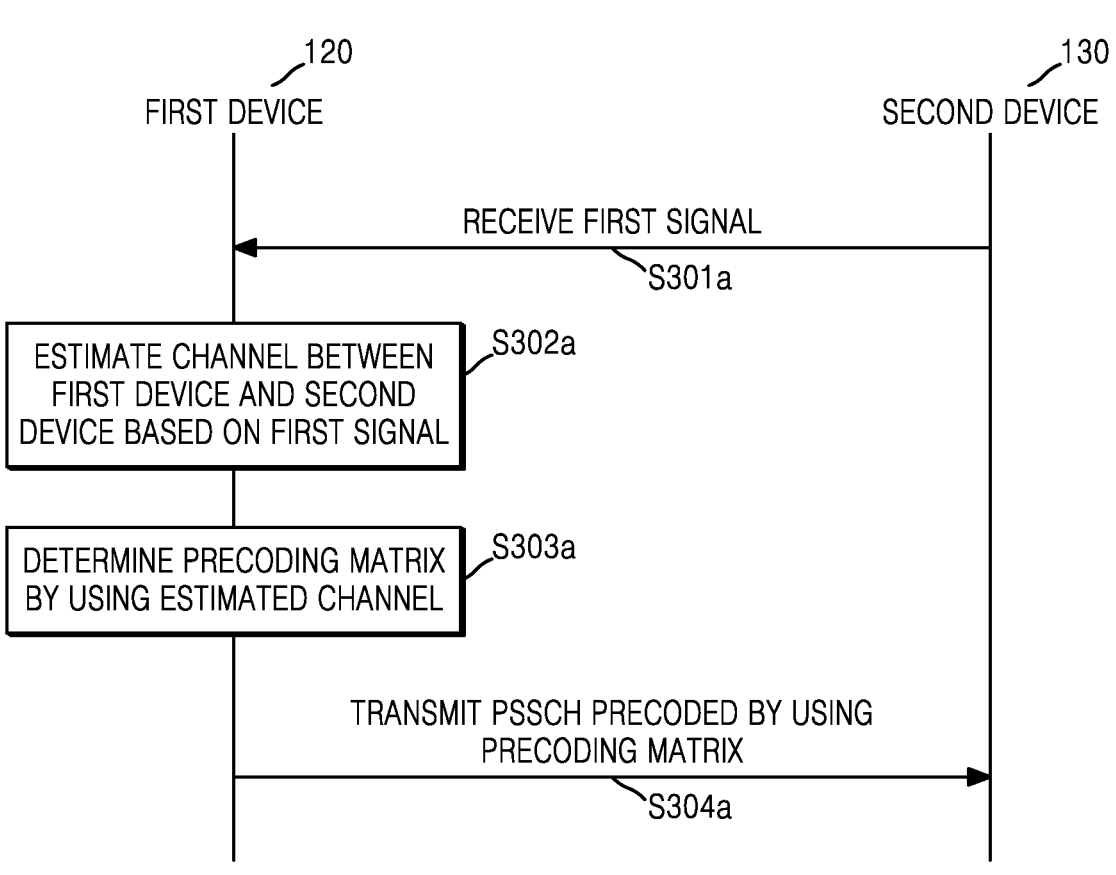
FIG. 3A illustrates a communication procedure, according to an embodiment.

FIG. 3A illustrates a communication procedure, according to an embodiment.

Referring to FIG. 3A, in operation S301*a*, the first device 120 may receive a first signal from the second device 130. The first signal may be transmitted based on a single port and/or two ports. The single port and the two ports may denote one antenna port and two antenna ports, respectively.

For example, the first signal may be and/or may include at least one of a PSSCH, a physical sidelink feedback channel (PSFCH), a sidelink synchronization signal block (S-SSB), a sidelink-primary synchronization signal (S-PSS), a sidelink-secondary synchronization signal (S-SSS), and a physical sidelink broadcasting channel (PSBCH) transmitted based on a single port. In another example, the first signal may be and/or may include a PSSCH transmitted based on two ports.

In operation S302*a*, the first device 120 may estimate a channel between the first device 120 and the second device 130 based on the first signal. When the first signal is based on a single port, the first device 120 may estimate a sidelink channel based on a single port. When the first signal is based on two ports, the first device 120 may estimate a sidelink channel based on the two ports.

For example, the first device 120 may estimate the channel between the first device 120 and the second device 130 by using a reference signal (e.g., a demodulation-reference signal (DM-RS)) included in the PSSCH based on a single port received from the second device 130. The first device 120 and the second device 130 may communicate with each other using a time division duplex (TDD) method. In such an embodiment, the first device 120 may estimate a sidelink channel from the first device 120 to the second device 130 by using the reference signal included in the PSSCH received from the second device 130. That is, the first device 120 may estimate the channel from the first device 120 to the second device 130 based on channel reciprocity.

In another example, the first device 120 may estimate the channel between the first device 120 and the second device 130 by using a PSFCH based on a single port received from the second device 130.

In another example, the first device 120 may estimate the channel between the first device 120 and the second device 130 by using a PSFCH based on two ports received from the second device 130.

In operation S303*a*, the first device 120 may determine a precoding matrix by using the estimated channel. The first device 120 may determine a rank 1 and/or a rank 2 precoding matrix based on the estimated channel. That is, the first device 120 may determine a precoding matrix corresponding to a single layer and/or a precoding matrix corresponding to two layers, based on the estimated channel.

In an embodiment, the first device 120 may design the precoding matrix by applying SVD to the estimated channel. A precoding matrix design based on SVD is described with reference to FIG. 4A.

In another example, the first device 120 may receive a transmit precoding matrix indicator (TPMI) from the second device 130, and design a precoding matrix by using the estimated channel and the TPMI. A precoding matrix design based on a TPMI is described with reference to FIG. 4B.

In operation S304*a*, the first device 120 may transmit the precoded PSSCH to the second device 130 that may have been precoded by using the precoding matrix. The first device 120 may transmit the precoded PSSCH to the second device 130 in sidelink communication, thereby potentially increasing data throughput and expanding sidelink coverage.

Figure 3B:
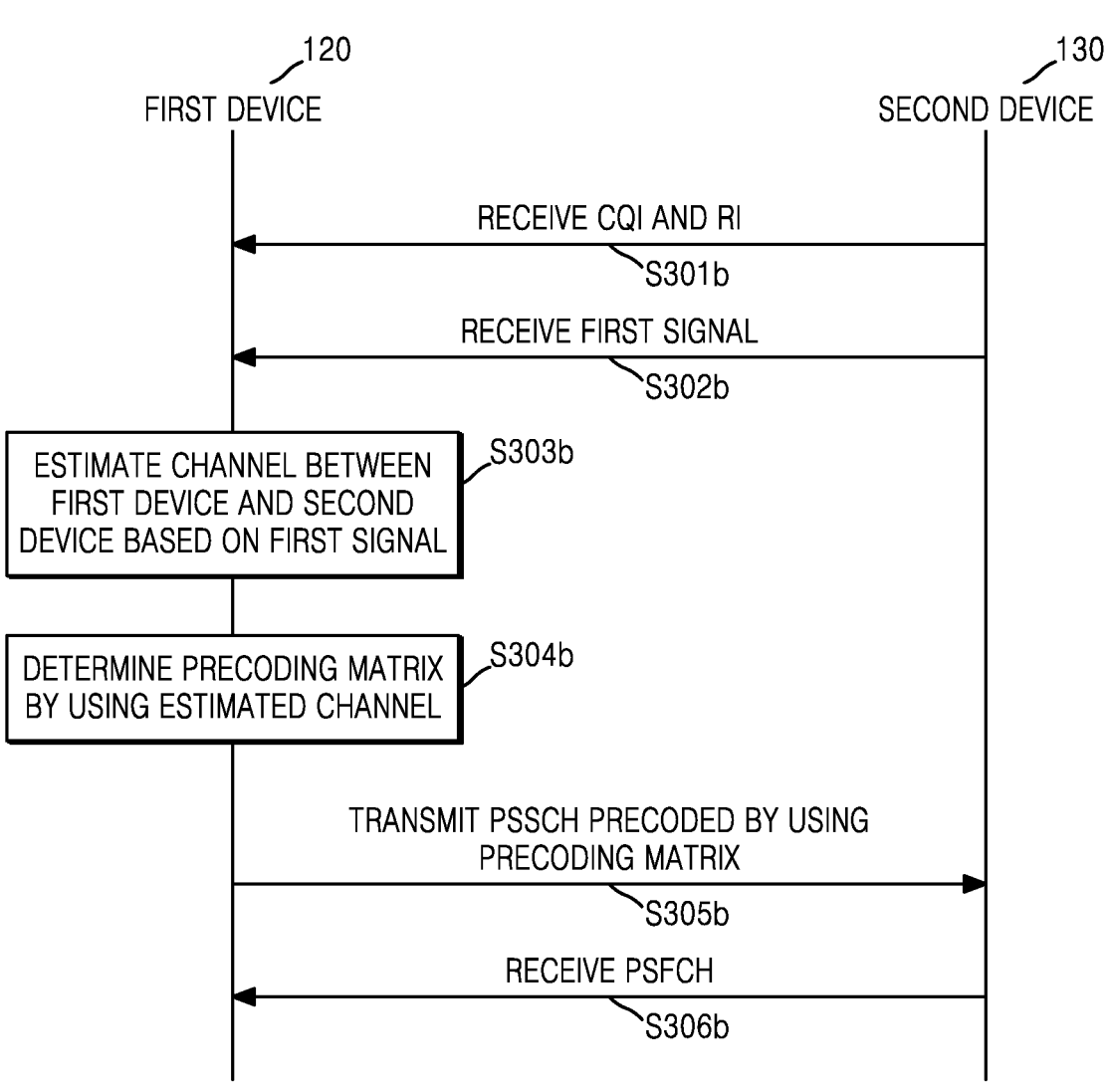
FIG. 3B illustrates a communication procedure, according to an embodiment.

FIG. 3B illustrates a communication procedure, according to an embodiment.

Referring to FIG. 3B, in operation S301*b*, the first device 120 may receive channel quality information (CQI) and/or a rank indicator (RI) from the second device 130. For example, the first device 120 may transmit a channel status information-reference signal (CSI-RS) to the second device 130, and receive a CSI-RS report including the CQI and RI from the second device 130. In an embodiment, the CQI and the RI may be transmitted together. The CQI and the RI may be transmitted based on a media access control element (MAC CE). The first device 120 may estimate a channel between the first device 120 and the second device 130 based on the received CQI and RI.

In operation S302*b*, the first device 120 may receive a first signal from the second device 130. The first signal may be transmitted based on a single port and/or on two ports. An example of the first signal is described with reference to FIG. 3A, and a repeated description may be omitted for the sake of brevity.

In operation S303*b*, the first device 120 may estimate the channel between the first device 120 and the second device 130 based on the first signal. The first device 120 may estimate the channel between the first device 120 and the second device 130 by using at least one of the received CQI, RI, and first signal.

In operation S304*b*, the first device 120 may determine a precoding matrix by using the estimated channel. Alternatively or additionally, the first device 120 may determine a rank for the channel between the first device 120 and the second device 130 by using the received RI.

For example, the first device 120 may apply SVD to the estimated channel, and design the precoding matrix by using the RI.

In another example, the first device 120 may receive a TPMI from the second device 130, and design the precoding matrix by using the estimated channel, the RI, and the TPMI.

In operation S305*b*, the first device 120 may transmit, to the second device 130, a precoded PSSCH that may have been precoded by using the precoding matrix. The first device 120 may transmit the precoded PSSCH to the second device 130 in sidelink communication, thereby potentially increasing data throughput and expanding sidelink coverage.

In operation S306*b*, the first device 120 may receive a PSFCH as feedback (e.g., a response) for the PSSCH. The PSFCH may indicate and/or include acknowledgement (ACK) and/or negative-acknowledgement (NACK) information for the PSSCH.

For example, when the PSFCH includes NACK information for the PSSCH, the first device 120 may retransmit the PSSCH to the second device 130.

In another example, when the PSFCH includes NACK information for the PSSCH, the first device 120 may re-estimate the channel between the first device 120 and the second device 130 by using the received PSFCH, re-design a precoder by using the re-estimated channel, and retransmit the PSSCH to the second device 130 by using the re-designed precoder.

Figure 4A:
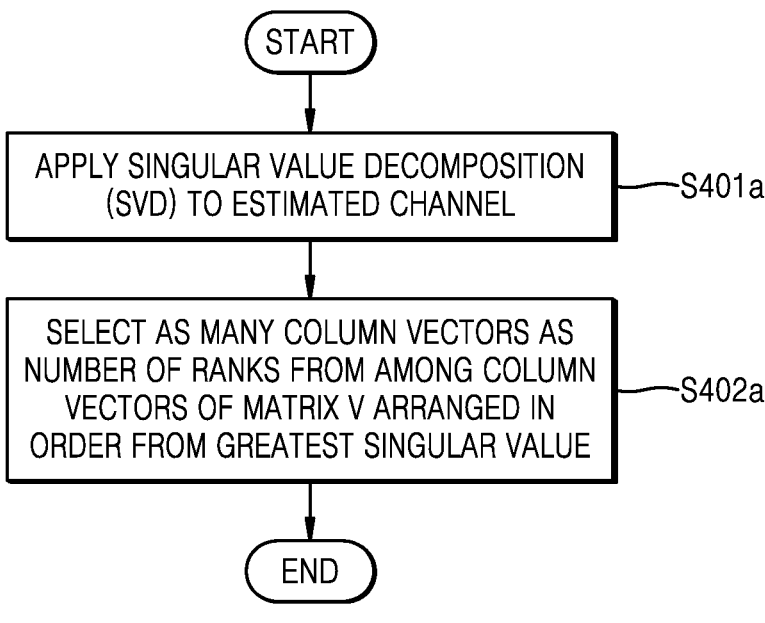
FIG. 4A illustrates a method of determining a precoding matrix, according to an embodiment.

FIG. 4A illustrates a method of determining a precoding matrix, according to an embodiment. FIG. 4A may be described with reference to FIGS. 1, 2, 3A, and 3B.

In an embodiment, first device 120 may estimate a channel between the first device 120 and the second device 130 by using the first signal from the second device 130. For example, the first device 120 may estimate a sidelink channel from the first device 120 to the second device 130. Alternatively or additionally, the first device 120 may receive CQI and/or an RI from the second device 130.

Referring to FIG. 4A, in operation S401*a*, the first device 120 may apply SVD to the estimated channel. The estimated channel to which SVD is applied may be expressed as Equation 1] shown below.

$$H_{estimated} = U \times S \times V^{H} \qquad \text{[Eq. 1]}$$

Referring to Equation 1, $H_{estimated}$ may represent a matrix for the estimated sidelink channel. For example, $H_{estimated}$ may be an $N_p$ by $N_t$ matrix. $N_p$ may represent the number of ports of the estimated channel. For example, in the embodiments of FIGS. 3A and 3B, $N_p$ may be set to one (1) or two (2). $N_t$ may represent the number of antennas of the first device 120 (e.g., the transmitting device). U may represent a left unitary matrix and may be an orthogonal matrix. Alternatively or additionally, U may be and/or may include a set of left singular vectors. U may be an $N_p$ by $N_t$ matrix. S may be a diagonal matrix. S may be an $N_p$ by $N_t$ matrix. S may have a singular value as a diagonal element. V may represent a right unitary matrix and may be an orthogonal matrix. V may be and/or may include a set of right singular vectors. V may be an $N_p$ by $N_t$ matrix. $V^{H}$ may be a hermitian matrix of V.

In operation S402*a*, the first device 120 may select as many column vectors as the number of ranks from among column vectors of the matrix V arranged in an order from the greatest singular value. For example, if the rank is determined to be one (1), the first device 120 may select one column vector from among the column vectors of the matrix V. Alternatively or additionally, if the rank is determined to be two (2), the first device 120 may select two column vectors from among the column vectors of the matrix V. A precoding matrix may be expressed as Equation 2 shown below.

$$W=V(:,1:\text{rank}) \tag{Eq. 2}$$

Referring to Equation 2, W may represent a precoding matrix, and V may represent a right unitary matrix. In V, the column vectors may be arranged in descending order according to singular values. When the rank is one (1), the precoding matrix may be a first column of V. When the rank is two (2), the precoding matrix may be a matrix including first and second columns of V. In the embodiments of FIGS. 3A and 3B, the rank may be one (1) or two (2). In an embodiment, the first device 120 may determine a rank based on the received RI.

Figure 4B:
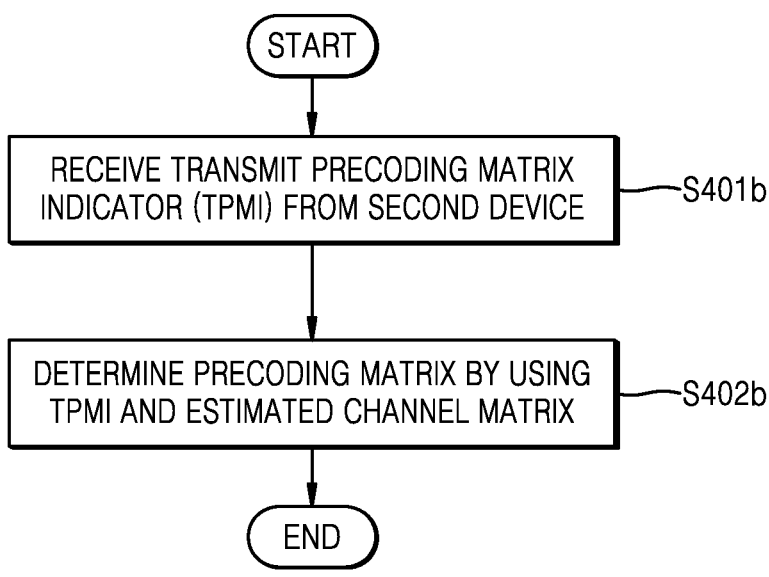
FIG. 4B illustrates a method of determining a precoding matrix, according to an embodiment.

FIG. 4B illustrates a method of determining a precoding matrix, according to an embodiment. FIG. 4B may be described with reference to FIGS. 1, 2, 3A, and 3B.

Referring to FIG. 4B, in operation S401*b*, the first device 120 may receive a TPMI from the second device 130. For example, the first device 120 may receive sidelink control information (SCI) including a TPMI from the second device 130. The TPMI may be used to indicate a precoder.

In operation S402*b*, the first device 120 may determine a precoding matrix by using the TPMI and an estimated matrix. In an embodiment, the first device 120 may determine the precoding matrix from a combination of the estimated sidelink matrix and the TPMI.

FIG. 5 illustrates an operating method of the first device, according to an embodiment. FIG. 5 may be described with reference to FIG. 1.

Referring to FIG. 5, in operation S501, the first device 120 may receive a first signal from the second device 130. For example, the first signal may be based on a single port and may be and/or may include at least one of a PSSCH, a PSFCH, a P-SSS, an S-SSS, and a PSBCH. In another example, the first signal may be a PSSCH based on an N multi-port. N may be an integer greater than or equal to 2.

In operation S502, the first device 120 may estimate a channel between the first device 120 and the second device 130 by using the first signal. For example, the first device 120 may estimate a channel from the first device 120 to the second device 130 based on the first signal and the TDD method.

In operation S503, the first device 120 may apply SVD to the estimated channel and generate a first orthogonal matrix including one or more left singular vectors, a diagonal matrix including one or more singular values, and/or a second orthogonal matrix including one or more right singular vectors.

When the first signal is based on a single port, the number of rows of a matrix for the estimated channel may be one (1), and the first orthogonal matrix may be a one by one matrix.

When the first signal is based on N multi-ports, the number of rows of the matrix for the estimated channel may correspond to N, and the first orthogonal matrix may be an N by N matrix.

In operation S504, the first device 120 may select the one or more right singular vectors corresponding to the number of ranks of the channel from the second orthogonal matrix.

In an embodiment, the first device 120 may receive CQI and an RI from the second device 130, and determine the rank of the channel by using the RI. The first device 120 may select as many right singular vectors as the number of determined ranks. The rank of the channel determined by using the RI may be one (1) or two (2). For example, if the rank is determined to be one (1), the first device 120 may select one right singular vector. Alternatively or additionally, if the rank is determined to be two (2), the first device 120 may select two right singular vectors.

In operation S505, the first device 120 may transmit, to the second device 130, a precoded PSSCH that may have been precoded based on a precoding matrix including the one or more selected right singular vectors.

In an embodiment, the first device 120 may receive, from the second device 130, a PSFCH signal including a PSFCH message that may include ACK/NACK information for the PSSCH.

Figure 6:
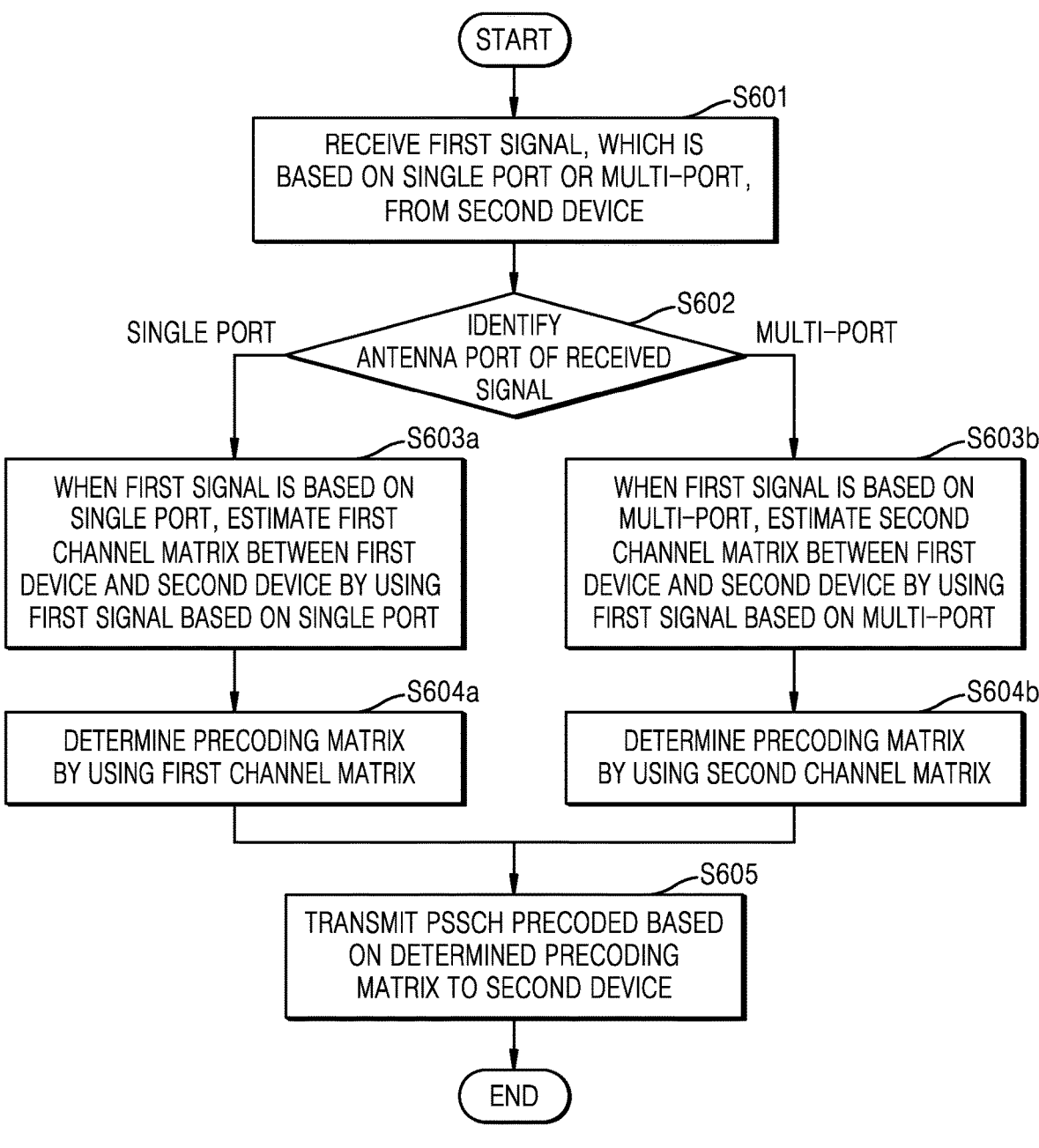
FIG. 6 depicts an operating method of a first device, according to an embodiment.

FIG. 6 depicts an operating method of the first device, according to an embodiment. FIG. 6 may be described with reference to FIG. 1.

Referring to FIG. 6, in operation S601, the first device 120 may receive a first signal, which may be based on a single port and/or a multi-port, from the second device 130.

In operation S602, the first device 120 may identify an antenna port of the first signal. For example, the first device 120 may identify whether the first signal is based on a single port or a multi-port.

The first signal based on a single port may be and/or may include at least one of a single port-PSSCH, PSFCH, PSFCH, P-SSS, S-SSS, and PSBCH. Alternatively or additionally, the first signal based on a multi-port may be and/or may include a multi-port-PSSCH.

In operation S603*a*, when the first signal is based on a single port, the first device 120 may estimate a first channel matrix between the first device 120 and the second device 130 by using the first signal based on the single port. In operation S604*a*, the first device 120 may determine a precoding matrix by using the first channel matrix.

For example, the first device 120 may apply SVD to the first channel matrix and generate a first orthogonal matrix including a first orthogonal matrix including one left singular vector, a first diagonal matrix including one or more singular values, and a second orthogonal matrix including one or more right singular vectors. The first device 120 may select the one or more right singular vectors corresponding to the number of ranks of the first channel matrix from the second orthogonal matrix in descending order according to singular values. The first device 120 may determine a precoding matrix including the selected right singular vectors. When the first device 120 receives a TPMI from the second device 130, a precoding matrix may be determined by further considering the TPMI.

In operation S603*b*, when the first signal is based on a multi-port, the first device 120 may estimate a second channel matrix between the first device 120 and the second device 130 by using the first signal based on the multi-port. In operation S604*b*, the first device 120 may determine a precoding matrix by using the second channel matrix.

For example, the first device 120 may apply SVD to the second channel matrix and generate a third orthogonal matrix including two left singular vectors, a second diagonal matrix including one or more singular values, and a fourth orthogonal matrix including one or more right singular vectors. The first device 120 may select the one or more right singular vectors corresponding to the number of ranks of the second channel matrix from the fourth orthogonal matrix in descending order according to singular values. When the first device 120 receives the TPMI from the second device 130, a precoding matrix may be determined by further considering the TPMI.

In operation S605, the first device 120 may transmit a precoded PSSCH that may have been precoded based on the determined precoding matrix to the second device 130. For example, the first device 120 may transmit, to the second device 130, a precoded PSSCH that may have been precoded based on a precoding matrix determined by using the first channel matrix and/or second channel matrix.

Figure 7:
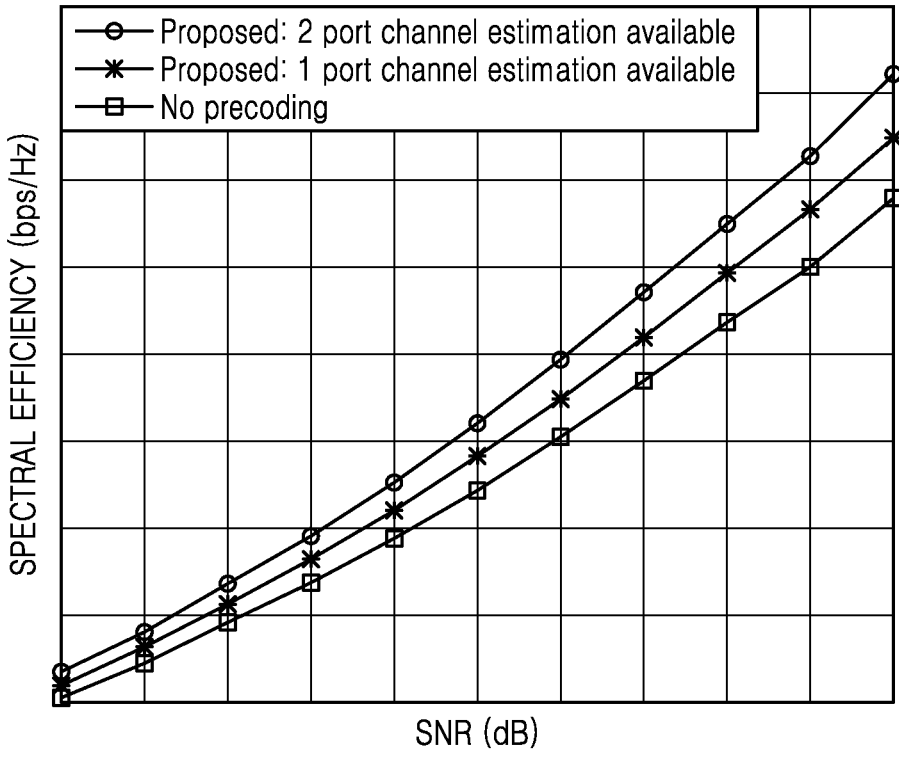
FIG. 7 illustrates the spectral efficiency of rank 1 physical sidelink shared channel (PSSCH) transmission for a terminal, according to an embodiment.
Figure 8:
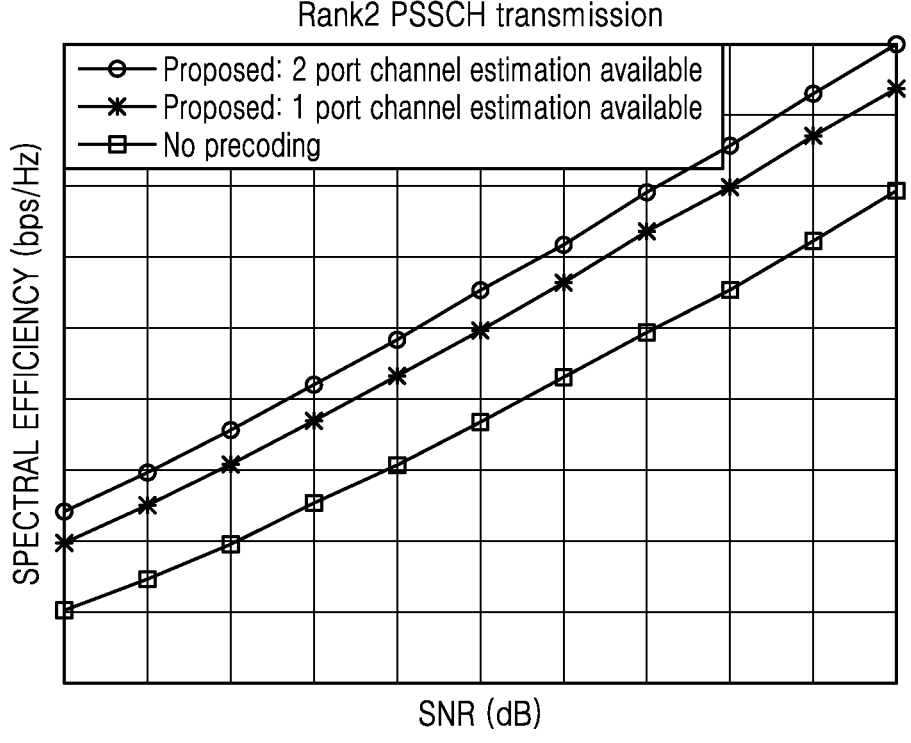
FIG. 8 illustrates the spectral efficiency of rank 2 physical sidelink shared channel (PSSCH) transmission for a terminal, according to an embodiment.

FIG. 7 illustrates the spectral efficiency of rank 1 PSSCH transmission for the first device, according to an embodiment. FIG. 8 illustrates the spectral efficiency of rank 2 PSSCH transmission for the first device, according to an embodiment. FIGS. 7 and 8 may be described with reference to FIG. 1.

Referring to FIG. 7, it may be understood that when the first device 120, according to an embodiment, transmits a PSSCH based on a rank 1 precoder, the spectral efficiency may be higher than when the PSSCH is transmitted without precoding. Alternatively or additionally, it may be understood that when the first device 120 estimates a channel by using a first signal based on two ports, the spectral efficiency may higher than when the channel is estimated by using a first signal based on a single port.

Referring to FIG. 8, it may be understood that when the first device 120, according to an embodiment, transmits a PSSCH based on a rank 2 precoder, the spectral efficiency may be higher than when the PSSCH is transmitted without precoding. Alternatively or additionally, it may be understood that when the first device 120 estimates a channel by using a first signal based on two ports, the spectral efficiency may be higher than when the channel is estimated by using a first signal based on a single port.

Figure 9:
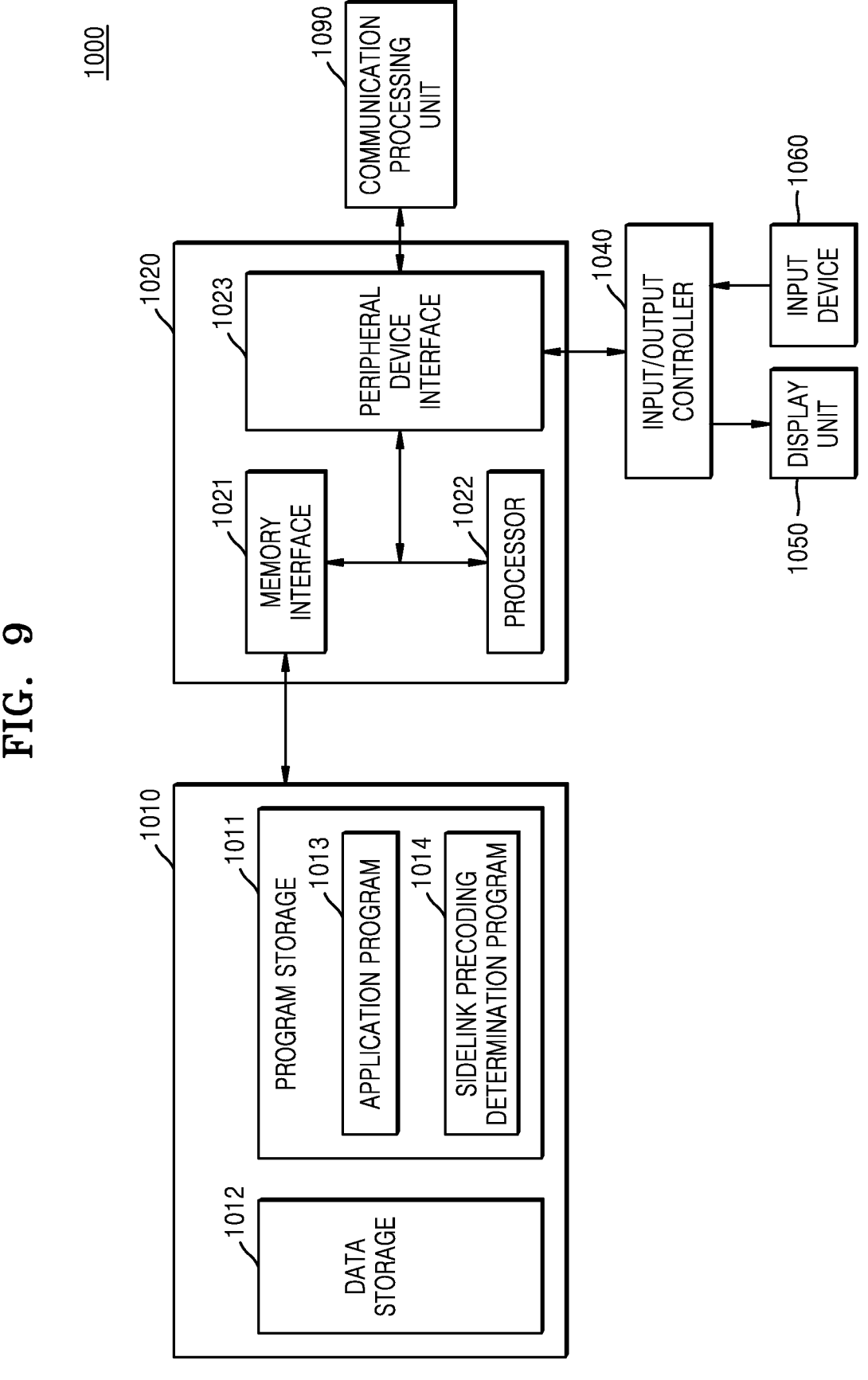
FIG. 9 is a block diagram of an electronic device, according to an embodiment.

FIG. 9 is a block diagram of an electronic device, according to an embodiment. Referring to FIG. 9, an electronic device 1000 may include a memory 1010, a processor unit 1020, an input/output controller 1040, a display unit 1050, an input device 1060, and a communication processing unit 1090. In an embodiment, the memory 1010 may include a plurality of memories.

The memory 1010 may include a program storage 1011 storing a program for controlling operations of the electronic device 1000, and a data storage 1012 storing data generated while a program is being executed. For example, the data storage 1012 may store data necessary for operations of an application program 1013 and/or a sidelink precoding determination program 1014. The program storage 1011 may include (e.g., store) the application program 1013 and/or the sidelink precoding determination program 1014. As used herein, a program included in the program storage 1011 may refer to a set of instructions and/or may be expressed as an instruction set.

The application program 1013 may include an application program operating on the electronic device 1000. That is, the application program 1013 may include instructions of an application driven by a processor 1022. In an embodiment, the sidelink precoding determination program 1014 may estimate a sidelink channel by using sidelink signals received, according to embodiments, and determine a precoding matrix by using the estimated channel, as described with reference to FIGS. 1 to 6.

The electronic device 1000 may further include a peripheral device interface 1023. The peripheral device interface 1023 may be configured to control a connection between an input/output peripheral device and the processor 1022 and the memory interface 1021. The processor 1022 may use at least one software program to control the electronic device 1000 to provide the corresponding service. For example, the processor 1022 may execute at least one program stored in the memory 1010 and provide a service corresponding to the at least one program.

The input/output controller 1040 may provide an interface between an input/output device, such as the display unit 1050 and the input device 1060, and the peripheral device interface 1023. Status information, input text, a moving picture, a still picture, and the like may be displayed on the display unit 1050. For example, information about an application program driven by the processor 1022 may be displayed on the display unit 1050.

The input device 1060 may provide input data generated by selection of the electronic device 1000 to the processor unit 1020 through the input/output controller 1040. For example, the input device 1060 may include a keypad including at least one hardware button, a touch pad for detecting touch information, and the like. For example, the input device 1060 may provide touch information, such as a touch, a touch motion, and a touch release, which are detected by the touch pad, to the processor 1022 through the input/output controller 1040. The electronic device 1000 may include the communication processing unit 1090 for performing communication functions for voice communication and data communication.

While the present disclosure has been particularly shown and described with reference to embodiments thereof, it may be understood that various changes in form and details may be made therein without departing from the spirit and scope of the following claims.

What is claimed is:

1. An operating method of a first device which communicates with a second device based on time division duplex (TDD), the operating method comprising:
   receiving a first signal from the second device;
   estimating a channel between the first device and the second device based on the first signal;
   generating, by applying singular value decomposition (SVD) to the channel, a first orthogonal matrix comprising one or more left singular vectors, a diagonal matrix comprising one or more singular values, and a second orthogonal matrix comprising one or more right singular vectors;
   selecting at least one right singular vector from the second orthogonal matrix in descending order according to the one or more singular values, a number of the selected at least one right singular vector is equal to a rank number of the channel; and
   transmitting, to the second device, a precoded physical sidelink shared channel (PSSCH) precoded based on a precoding matrix comprising the selected at least one right singular vector.

2. The operating method of claim 1, wherein the selecting the at least one right singular vector comprises:
   receiving, from the second device, channel quality information (CQI) and a rank indicator (RI); and
   determining the rank number of the channel based on the RI.

3. The operating method of claim 2, wherein the rank number of the channel determined based on the RI is 1 or 2.

4. The operating method of claim 1, wherein the first signal is based on a single port, and
   wherein the first signal comprises at least one of a PSSCH, a physical sidelink feedback channel (PSFCH), a sidelink primary synchronization signal (P-SSS), a sidelink secondary synchronization signal (S-SSS), or a physical sidelink broadcast channel (PSBCH).

5. The operating method of claim 4, wherein a number of rows of the channel is 1, and
   wherein the first orthogonal matrix comprises a one by one matrix.
6. The operating method of claim 1, wherein the first signal comprises a PSSCH based on N multi-ports, and N is an integer greater than or equal to 2.
7. The operating method of claim 6, wherein a number of rows of the channel corresponds to N, and
   the first orthogonal matrix comprises an N by N matrix.
8. The operating method of claim 1, further comprising:
   receiving, from the second device, a physical sidelink feedback channel (PSFCH) indicating acknowledgement of the precoded PSSCH.
9. The operating method of claim 1, wherein the estimating the channel comprises estimating the channel from the first device to the second device based on the first signal and the TDD.
10. An operating method of a first device which communicates with a second device based on time division duplex (TDD), the operating method comprising:
   receiving, from the second device, a first signal which is based on a single port or two ports;
   estimating a channel matrix between the first device and the second device based on the first signal;
   determining a precoding matrix based on the channel matrix, the precoding matrix comprising a number of right singular vectors that is equal to a rank number of the channel matrix; and
   transmitting, to the second device, a precoded physical sidelink shared channel (PSSCH) precoded based on the precoding matrix to the second device,
   wherein the first signal based on the single port comprises at least one of a single port-PSSCH, a physical sidelink feedback channel (PSFCH), a sidelink primary synchronization signal (P-SSS), a sidelink secondary synchronization signal (S-SSS), or a physical sidelink broadcast channel (PSBCH), and
   wherein the first signal based on the two ports comprises a 2 port-PSSCH.
11. The operating method of claim 10, wherein the first signal is based on the single port; and
   wherein the determining of the precoding matrix comprises:
      generating, by applying singular value decomposition (SVD) to the channel matrix, a first orthogonal matrix comprising one left singular vector, a diagonal matrix comprising one or more singular values, and a second orthogonal matrix comprising one or more right singular vectors; and
      selecting at least one right singular vector from the second orthogonal matrix in descending order according to the one or more singular values.
12. The operating method of claim 10, wherein the first signal is based on the two ports; and
   wherein the determining the precoding matrix comprises:
      generating, by applying singular value decomposition (SVD) to the channel matrix, a first orthogonal matrix comprising two left singular vectors, a diagonal matrix comprising one or more singular values, and a second orthogonal matrix comprising one or more right singular vectors; and
      selecting at least one right singular vector from the second orthogonal matrix in descending order according to the one or more singular values.

13. The operating method of claim 10, further comprising:
   receiving a transmit precoding matrix indicator (TPMI) from the second device,
   wherein the determining the precoding matrix comprises determining the precoding matrix based on the channel matrix and the TPMI.
14. A first device which communicates with a second device based on time division duplex (TDD), the first device comprising:
   a transceiver;
   a memory storing instructions; and
   a processor communicatively coupled to the transceiver and the memory, and configured to execute the instructions to:
      receive a first signal from the second device through the transceiver;
      estimate a channel between the first device and the second device based on the first signal;
      generate, by applying singular value decomposition (SVD) to the channel, a first orthogonal matrix comprising one or more left singular vectors, a diagonal matrix comprising one or more singular values, and a second orthogonal matrix comprising one or more right singular vectors;
      select at least one right singular vector from the second orthogonal matrix in descending order according to the one or more singular values, a number of the selected at least one right singular vector is equal to a rank number of the channel; and
      transmit, to the second device through the transceiver, a precoded physical sidelink shared channel (PSSCH) precoded based on a precoding matrix and comprising the selected at least one right singular vector.
15. The first device of claim 14, wherein the processor is further configured to:
   receive channel quality information (CQI) and a rank indicator (RI) from the second device through the transceiver; and
   determine the rank number of the channel based on the RI.
16. The first device of claim 15, wherein the rank number of the channel determined based on the RI comprises 1 or 2.
17. The first device of claim 14, wherein the first signal is based on a single port, and
   wherein the first signal comprises at least one of a PSSCH, a physical sidelink feedback channel (PSFCH), a sidelink primary synchronization signal (P-SSS), a sidelink secondary synchronization signal (S-SSS), and a physical sidelink broadcast channel (PSBCH).
18. The first device of claim 17, wherein a number of rows of the channel is 1, and
   wherein the first orthogonal matrix comprises a one by one matrix.
19. The first device of claim 14, wherein the first signal comprises a PSSCH based on N multi-ports, and N is an integer greater than or equal to 2.
20. The first device of claim 19, wherein a number of rows of the channel corresponds to N, and
   wherein the first orthogonal matrix comprises an N by N matrix.

* * * * *